United States Patent [19]

Farnam et al.

[11] 4,160,561
[45] Jul. 10, 1979

[54] VEHICLE BUMPER SHIM AND METHOD

[75] Inventors: Robert G. Farnam, Stevens Point, Wis.; Alexander Lomik, Brighton, Mich.

[73] Assignee: F. D. Farnam Co., Lyons, Ill.

[21] Appl. No.: 829,451

[22] Filed: Aug. 31, 1977

[51] Int. Cl.² .............................................. B60R 19/02
[52] U.S. Cl. .................................. 293/1; 113/116 V; 293/102; 293/155; 308/244
[58] Field of Search .................... 293/1, 60, 70, 84, 85, 293/99; 188/196 V; 308/244; 113/116 V; 213/220; 85/50 R

[56] References Cited

U.S. PATENT DOCUMENTS

| 1,748,412 | 2/1930 | Crawford | 308/244 X |
| 2,707,310 | 5/1955 | Goodrich | 308/244 X |
| 2,772,596 | 12/1956 | Trussell | 308/244 X |
| 3,773,373 | 11/1973 | McLauchlan | 293/99 |

Primary Examiner—Trygve M. Blix
Assistant Examiner—Sherman D. Basinger
Attorney, Agent, or Firm—Mason, Kolehmainen, Rathburn & Wyss

[57] ABSTRACT

A shim is clamped between a component of a vehicle bumper assembly and a support member to provide a desired spacing for bumper alignment. The weight of the shim and the cost of material for its manufacture are minimized by forming the shim from sheet metal half the thickness of the desired spacing, and by folding the metal to provide double thickness in selected load bearing regions. A number of openings may be provided in other regions further to reduce the weight. Additional folded areas may be used for applications where loading is not restricted to areas adjacent the bolts, and serrations may be embossed in the shim to facilitate mounting of the shim and enhance its stiffness.

17 Claims, 12 Drawing Figures

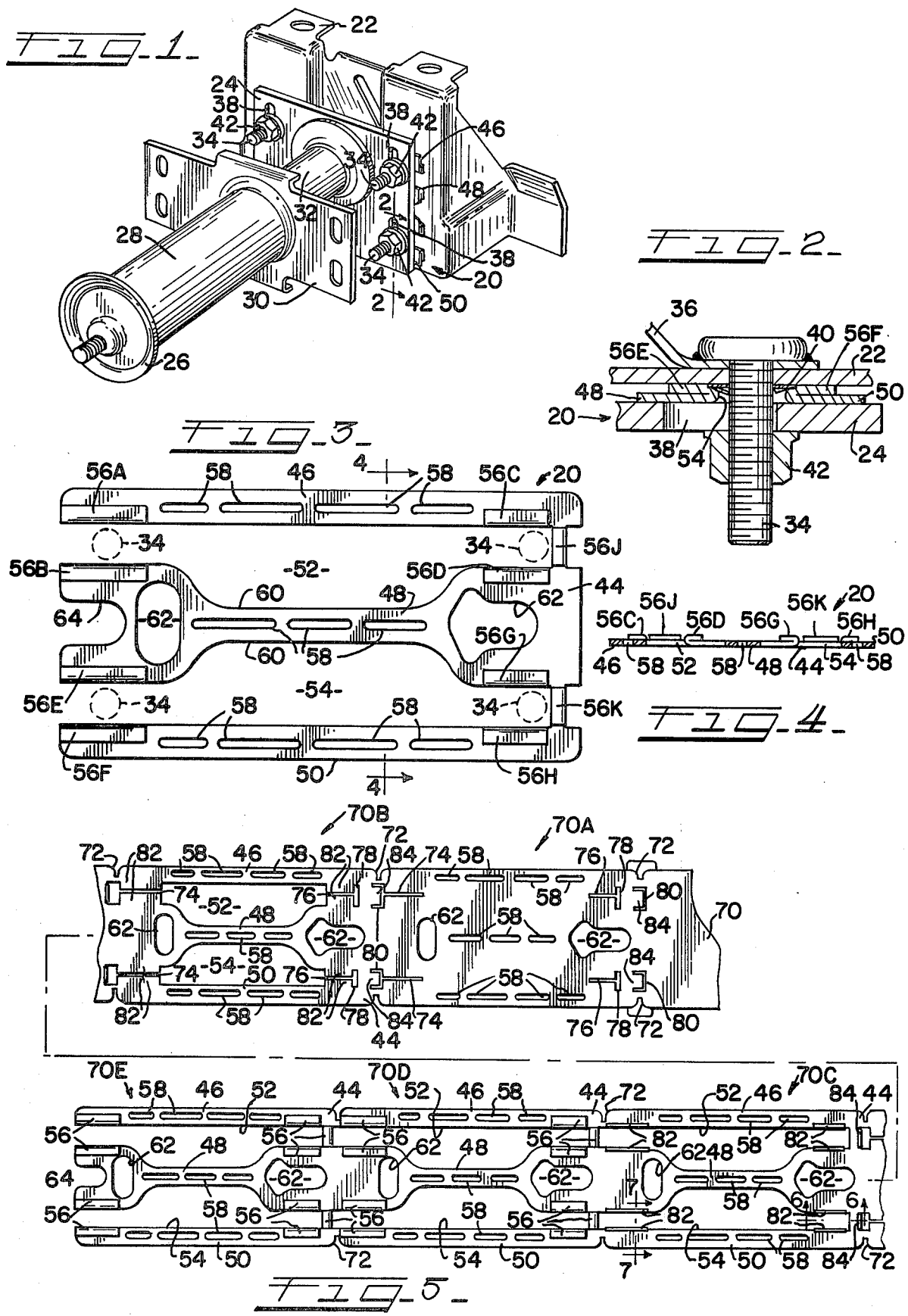

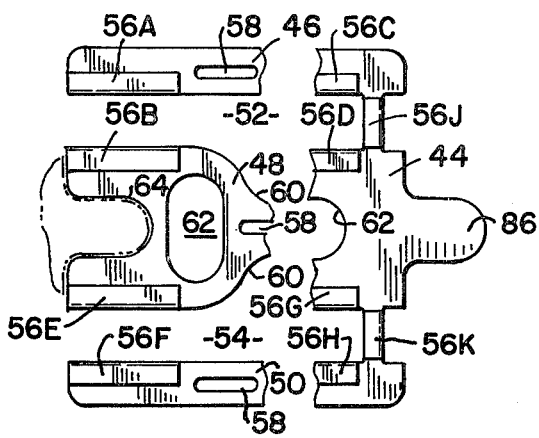
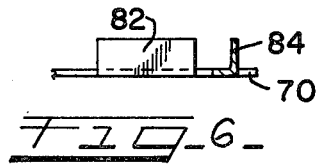
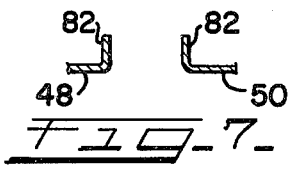
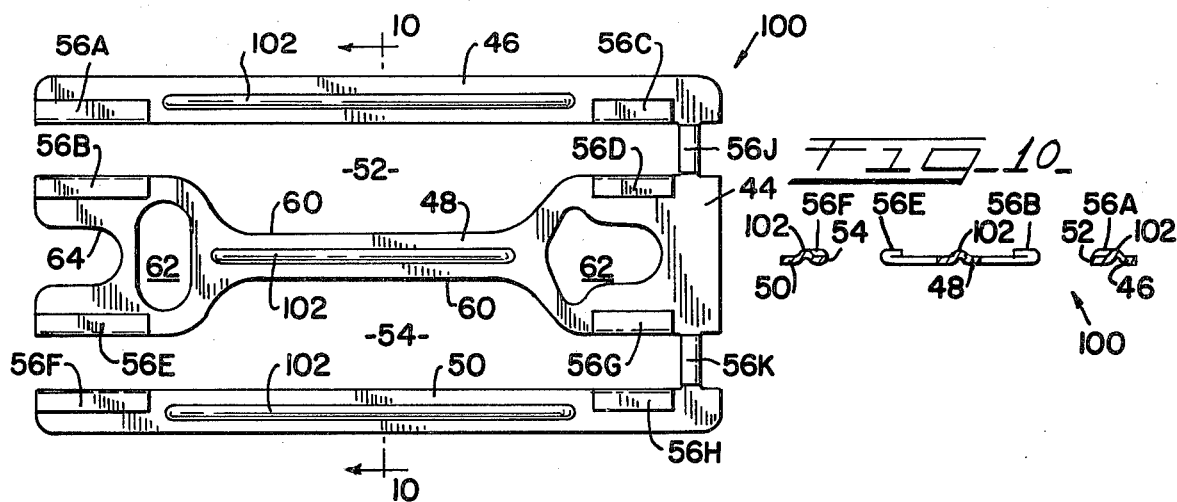
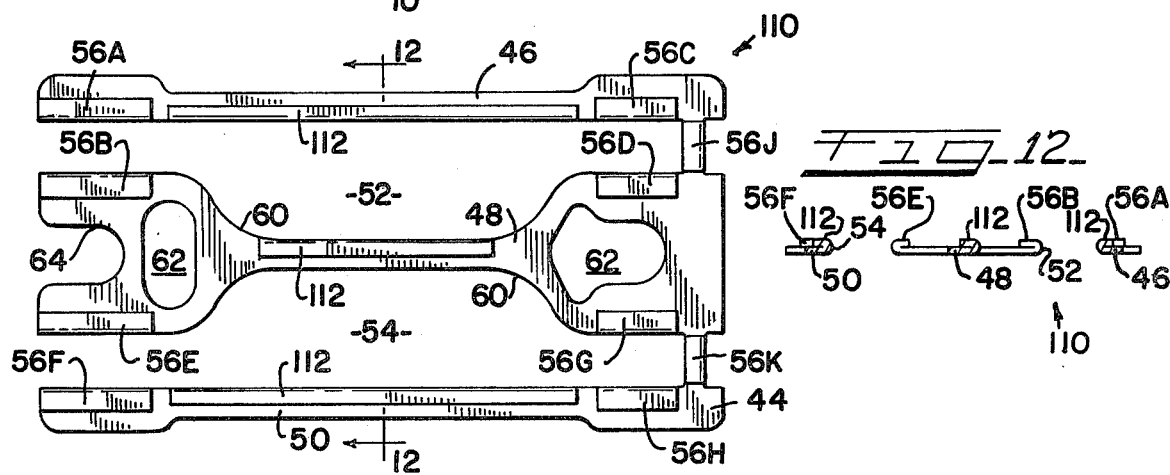

VEHICLE BUMPER SHIM AND METHOD

The present invention relates to shims used in automotive vehicles and to a method for manufacturing such shims.

During the assembly of an automobile or other vehicle, shims are customarily used to assure proper alignment of components of the vehicle, for example, the alignment of the bumpers with respect to the frame and body of the vehicle. Typically, a component of the bumper assembly such as a bumper bracket is attached to a support member which may be supported by or comprise a part of the vehicle frame. Due to tolerance variations in preceding assembly operations, when the bumpers are mounted the support members are not consistently in a uniform position.

In order to assure that the bumpers are aligned properly, both for aesthetic and functional reasons, shims may be inserted in the neighborhood of the mounting bolts between the bumper assembly component and the support member. In the past, these shims have been formed of sheet material having thicknesses of, for example, one-sixteenth inch and one-eighth inch. In one typical arrangement, four mounting bolts in a rectangular array are used, and the shim takes the form of a fork-shaped element of uniform thickness having three tines defining two slots, each slot receiving two mounting bolts. Depending upon requirements for proper alignment, one or a number of shims selected from the two available thicknesses may be stacked to provide a desired spacing between the bumper assembly component and the support member.

The clamp load on the shim after assembly is large, and in some installations is highly localized in the regions immediately adjacent the mounting bolts. In order to provide sufficient strength, the shims are typically formed of steel, and in some cases, of aluminum.

Because of the important goal of fuel economy, it is desirable to make all components of a vehicle as light as possible, particularly if this can be accomplished economiccally. However, the use of lighter weight and less expensive materials for vehicle bumper shims can lead to difficulties in some installations because of a decrease in strength. Not only must the shims resist crushing during assembly, but also they should not exhibit torque loss over a period of time due to vibrations, impact, temperature changes, and other conditions prevalent in the assembly.

The bumper mounting systems adopted for different vehicles or by different manufacturers can vary widely, and shims of diverse configurations are required. Moreover, shims of various sizes and shapes are utilized for many vehicle components other than bumpers, for example in the mounting of body and suspension components and the like.

Among the objects of the present invention are to provide improvements in the structure and method of manufacture of shims for vehicles; to provide an improved vehicle bumper shim; to provide a shim which makes possible a very large reduction in weight; to provide a shim which uses a minimum amount of material thereby effecting a reduction in weight and a reduction in material costs; to provide a shim which although inexpensive and light in weight is the equal of shims used heretofore in strength, performance characteristics and ease of handling and assembly; and to provide improvements in the methods of manufacturing vehicle bumper shims.

In brief, the above and other objects and advantages of the present invention are realized through the provision of a vehicle shim formed as a unitary body of sheet metal. The shim serves to establish a predetermined spacing between vehicle components such as a bumper assembly component and a support member.

In accordance with an important feature of the invention, a substantial portion of the surface area of the shim is a single layer of the sheet metal, while selected load bearing regions of the shim are a multiple thickness of the sheet metal in order to provide the desired spacing yet minimizing weight and material costs. In a preferred embodiment, ears integral with the sheet metal are folded over to provide double thickness load bearing regions.

The weight of the shim may be further reduced by providing openings in non-load bearing regions. In order to facilitate sliding insertion of the shim and to enhance stiffness if desired, embossed regions or additional multiple thickness areas may be provided.

The invention together with the above and other objects may be best understood from consideration of the following detailed description of the embodiments of the invention illustrated in the drawings, wherein:

FIG. 1 is a perspective view illustrating a shim constructed in accordance with the present invention used in the alignment of a bumper assembly component with respect to a support member;

FIG. 2 is a sectional view on an enlarged scale taken along the line 2—2 of FIG. 1;

FIG. 3 is a top plan view of a shim constructed in accordance with the present invention;

FIG. 4 is a sectional view taken along the line 4—4 of FIG. 3;

FIG. 5 is a top plan view of a sheet metal blank illustrating steps performed in the manufacture of a vehicle bumper shim in accordance with the method of the present invention;

FIG. 6 is a fragmentary sectional view on an enlarged scale taken along the line 6—6 of FIG. 5;

FIG. 7 is a fragmentary sectional view on an enlarged scale taken along the line 7—7 of FIG. 5;

FIG. 8 is a broken, top plan view of a vehicle bumper shim comprising an alternative embodiment of the present invention;

FIG. 9 is a top plan view of a vehicle bumper shim comprising another alternative embodiment of the present invention;

FIG. 10 is a sectional view taken along the line 10—10 of FIG. 9;

FIG. 11 is a top plan view of a vehicle bumper shim comprising yet another alternative embodiment of the present invention; and FIG. 12 is a sectional view taken along the line 12—12 of FIG. 11.

Having reference now to the drawings, and initially to FIGS. 1 and 2, there is illustrated a portion of a typical vehicle bumper installation including a vehicle bumper shim embodying and manufactured in accordance with the principles of the present invention. The shim, designated as a whole by the reference numeral 20, is interposed between a component 22 of the vehicle bumper assembly and a support member 24 upon which the bumper assembly is mounted. The arrangement shown in FIGS. 1 and 2 is intended to illustrate one type of installation, and it should be understood that the shim 20 of the present invention can be utilized with many other types of bumper mounting systems, and that the principles of the present invention are applicable not only to bumper shims of various configurations, but also to other types of shims.

In the arrangement illustrated in FIG. 1, the bumper support member 24 is carried by the frame of the vehicle through the agency of a shock absorber device 26 including a cylinder 28 carrying a bracket 30 adapted to be attached to a frame component or the like. A piston 32 slidable in the cylinder 28 carries the support member 24.

A vehicle bumper (not shown) is adapted to be carried by the bumper assembly component 22 in conventional manner. A rectangular array of four mounting bolts 34 welded to a bolt holder 36 (FIG. 2) are carried by the component 22 for attaching the component to the support member 24. The illustrated structure is typical of many vehicle bumper installations in that it employs a rectangular or other regular array of shanked fasteners such as bolts or studs or the like. The term "bolt" as used herein is intended to encompass such equivalent fasteners.

Each bolt 34 extends from the component 22 through a slot 38 in the support member 24. Prior to assembly, the bolt holder 36 with the bolts 34 is held in position upon the component 22 by a number of sheet metal jam nuts 40 (FIG. 2), one applied over the shank of each bolt 34. Locking tangs or other conventional structure formed on the jam nuts 40 engage the threads of the bolts 34 to hold the bolts 34 in position while they are inserted into slots 38. Flange nuts 42 or equivalent fasteners are threaded onto the bolts 34 to clamp the support member 24 and the component 22 toward one another. It should be understood that each bumper of a vehicle typically includes two spaced installation systems such as that illustrated in FIG. 1.

Because the bumper of a vehicle is normally visually prominent, it is highly desirable for aesthetic reasons that it be properly aligned with the adjacent regions of the vehicle body. Moreover, proper alignment may be desirable for proper functioning of other vehicle components such as the illustrated shock absorber device 26. Because of accumulated tolerance variations in the manufacture of the vehicle, it frequently occurs that the two spaced support members 24 for a bumper are not properly aligned with one another. Thus, if the components 22 of a bumper are directly attached to the spaced support members 24, the bumper is misaligned.

In order to make possible proper alignment, one or more vehicle bumper shims are used. The bumper shims in accordance with known practice are provided in one or two nominal thicknesses, and can be used individually or in stacks to provide a desired spacing between the component 22 and the support member 24. During mounting of the bumper, none or one or more shims are selected and installed as needed.

Having reference now to FIGS. 3 and 4, the vehicle bumper shim 20 of the present invention is a unitary body of sheet metal material having a flat, planar, generally rectangular profile. In the specific illustrated embodiments of the invention, the shim 20 is generally fork-shaped in outline with a base or end portion 44 extending across its width and having three elongated, generally parallel tines or pronglike portions 46, 48 and 50 extending therefrom. A pair of elongated slots 52 and 54 separate respectively the tines 46 and 48 and the tines 48 and 50. Opposite the base 44, the slots 52 and 54 are open-ended. This configuration permits the shim 20 to be grasped by the base portion 44 and inserted or removed from between the component 22 and the component 24. The open-ended slots 52 and 54 receive the bolts 34, and the bolts occupy the positions indicated in broken lines in FIG. 3.

In accordance with an important feature of the present invention, the structure of the shim 20 minimizes the weight of the shim and the material requirements while providing ample strength to maintain a desired spacing and to bear the clamp loads imposed in the final assembly. These important results are attained by forming the shim 20 of sheet metal material having a thickness smaller than the desired spacing to be obtained in use of the shim. A substantial portion of the surface area of the shim 20 is formed of a single layer of material. In order to achieve the desired spacing and to provide ample strength in use, certain selected areas are formed of multiple layers of the sheet metal material. The layers comprise superimposed thicknesses of the sheet material and by "superimposed" is meant two or more layers in face to face juxtaposed position.

More specifically, after the shim 20 has been installed and the flange bolts 34 are inserted and tightened via the nuts 42 to a predetermined torque, the majority of the clamp load to which the shim is subjected exists immediately adjacent the bolts 34. This is particularly the case in an arrangement such as illustrated in FIGS. 1 and 2 wherein jam nuts 40 are used. Slots 52 and 54 are shaped so that after installation, portions of the base 44 and of the tines 46, 48 and 50 are closely adjacent the bolts 34 in order to receive the clamp load. Thus, each bolt 34 is located immediately adjacent to load bearing regions 56 on the shim 20.

More particularly, the tines 46 and 48 include a first pair of load bearing regions 56A and 56B flanking one of the bolts 34, and a second pair of load bearing regions 56C and 56D flanking another of the bolts 34. Similarly, the tines 50 and 48 include regions 56E and 56F and regions 56G and 56H flanking the other two bolts 34. In addition, in the illustrated arrangement, the base portion 44 includes an additional pair of load bearing regions 56J and 56K adjacent two of the bolts 34. Each of the load bearing regions 56 comprises multiple layers of the sheet metal material of the shim 20 to the end that the desired spacing is maintained while ample strength and resistance to crushing and torque loss is provided.

Because a substantial portion of the surface area of the shim 20 comprises material only a fraction as thick as the desired spacing, a very substantial weight saving is achieved as compared with shims of the prior art using full thickness material throughout. Moreover, the amount of metal material used and its cost is greatly reduced.

In the preferred embodiments of the invention illustrated in the drawings, the single thickness regions of the strip are formed of sheet metal, such as steel or aluminum, having a thickness equal to one-half of the desired shim spacing. The load bearing regions are of double thickness formed as folded over ears or tabs of the sheet metal. For example, the shim may be provided in two sizes of nominal one-sixteenth inch (0.060 inch) and nominal one-eighth inch (0.120 inch) from sheet metal having a thickness of 0.030 inch or 0.060 inch respectively.

Further reductions in weight and cost are achieved by providing openings in the sheet metal material in regions other than the load bearing regions 56. As an example in the illustrated arrangement, a number of elongated slots 58 are provided in each of the tines 46, 48 and 50. Since the central tine 48 need assume its full width only in the regions of the load bearing areas 56B, 56E, 56D and 56G, material is removed as indicated by the reference numeral 60 in the central portion of this tine. Large openings 62 and a slot 64 are provided in the wide, end portions of tine 48.

Having reference now to FIG. 5, there is illustrated a segment of a web or strip 70 of the sheet metal material upon which successive operations are performed in accordance with the method of the present invention. The web 70 has a width equal to that of a shim 20. Preferably, the sheet metal web or strip 70 is provided in an elongated form such as a roll which can be periodically advanced to a stamping press or other area where a number of progressive operations are carried out in the manufacture of the shim 20 from the sheet metal web 70.

In the illustrated embodiment of the method, the first operations are performed upon the strip at a region generally designated as 70A. These operations include punching of the slots 58 and the openings 62 as well as forming notches 72 to define the joined, adjacent ends of two shims 20. Thereafter, the openings 62 can serve as pilot holes if the method is carried out in a stamping press.

In accordance with an important feature of the present invention, the double layer load bearing regions 56 are formed by folding of sheet metal material which would otherwise comprise scrap in the manufacture of the shim 20. The first operations leading to this structure are performed at region 70A of the strip where longitudinally extending slits or slots 74 and 76, transversely extending slots or openings 78, and generally C-shaped slits or slots 80 are formed. These elements 74, 76 and 78 and 80 are generally aligned in two longitudinal rows corresponding with the regions in which the slots 52 and 54 are to be formed in the shim 20.

The next operations performed on the web 70 are illustrated at the portion of the web designated by the reference numeral 70B. In this region, the slots 52 and 54 are cut from the material of the web to define the bands, tines or prong portions 46, 48 and 50. Each of the slots 52 and 54 extend between one of the slits 74 and one of the slits 76. Consequently, each of the slits 74 extends between one of the slots 52 or 54 and a slot 80. Similarly, each of the slits 76 extends between one of the slots 52 or 54 and one of the transverse slots 78. In this manner, the slits 74 and 76 define a plurality of tabs or ears 82. A similar tab or ear 84 is defined by each of the C-shaped slots 80.

Regions 70C and 70D of the strip 70 illustrate the next operations carried out in the manufacture of the vehicle bumper shim 20 in accordance with the present invention. At regions 70C, as can be seen with reference to FIGS. 6 and 7 as well as to FIG. 5, each of the ears 82 and 84 is folded at right angles to the plane of the web 70. At region 70D, the outwardly extending ears 82 and 84 are folded down onto the surrounding material of the webs 70, thereby to form and define the load bearing regions 56.

As can clearly be seen from a comparison of portions 70B and 70D of the strip, the ears or tabs 82 and 84 are defined in regions which would comprise scrap were the shim 20 to be formed of material of uniform thickness. As a result, the double thickness load bearing regions 56 are provided with virtually no addition in material cost. Since these regions are of relatively minor extent compared to the entire surface area of the shim 20, these regions are provided while effecting a great saving in weight as compared with shims of single thickness.

At region 70E of the strip 70, the completed shim 20 is severed from the end of the strip and the slot 64 is formed during the severing operation. In the embodiments of FIGS. 1–7, the material removed in forming this slot is scrap. However, with reference to FIG. 8, it is possible if desired to utilize this material to form an outwardly extending tab or handle 86 which may be useful in effecting the sliding insertion of the shim in a bumper assembly installation.

Having reference now to FIGS. 9 and 10, there is illustrated a vehicle bumper shim 100 comprising another embodiment of the present invention. In many respects, the shim 100 is similar to the shim 20 described in detail above. Similar portions are provided with the same reference numerals and are not again described.

Since the majority of the surface area of a shim constructed in accordance with the invention has a thickness equal to half of the desired spacing to be achieved, the load bearing portions 56 extend above the surface of the shim on one side. These projecting regions can interfere with sliding insertion of the shim. For example, where two or more shims are stacked and the second shim is slidingly inserted, the leading ends of the tines 46, 48 and 50 can catch on the projecting regions 56A, 56B, 56E and 56F of the first inserted shim.

In accordance with a feature of the invention, and to overcome this problem, the shim 100 is provided with embossed or creased ridges or serrations 102. Each of the tines 46, 48 and 50 is provided with a serration 102 and as best appears in FIG. 10 the serrations each have a height equal to the material thickness so that the overall thickness is equal to that of the load bearing regions 56. With this arrangement, adjacent shims slide across one another and are easily inserted without interference into a stacked configuration.

Another advantage of the serrations or creases 102 is that they render the tines stiffer than those of the shim 20. Although as illustrated in FIGS. 9 and 10, the slots 58 are omitted, it would be possible to provide both the slots and the serrations in a single shim if desired.

Yet another embodiment of the present invention is the vehicle bumper shim 110 illustrated in FIGS. 11 and 12. The shim 110 is similar in many respects to the shim 20 described in detail above. Similar elements are provided with the same reference numerals and are not again described in detail.

The shim 110 is provided with additional multiple thickness regions 112, each associated with one of the tines 46, 48 and 50. As with the regions 56, each of the regions 112 is formed by folding over material which would otherwise constitute scrap in the manufacture of the shim.

The additional folded regions 112 enhance the stiffness of the tines. Moreover, due to their increased strength, it is possible to form the tines with a narrower surface area than those of the shim 20 described above.

In one type of installation, sheet metal fasteners such as the fastener 40 shown in FIG. 2 are not used. In this type of installation, the clamp load between a bumper assembly component and a support member may be more widely distributed over the area of the shim. The shim 110 having additional folded regions 112 may be of particular utility in this type of installation since the regions 112 can be subjected to substantial loading. The regions 112 also serve a function similar to that of the serrations 102 of the shim 100 in facilitating sliding insertion and stacking of adjacent shims.

While the invention has been described with reference to details of the illustrated embodiments and with reference to details of the preferred method, such details are not intended to limit the invention as defined in the following claims.

What is claimed and desired to be secured by Letters Patent of the United States is:

1. An article of manufacture comprising a shim for establishing a desired spacing between two vehicle components clamped toward one another by at least one shanked fastener having a head, the shim being in the form of a unitary planar body of sheet material having a thickness equal to a fraction of said spacing; at least one opening extending through said body for receiving said fastener shank, a substantial portion of the surface area of the shim being a single thickness of the sheet material, said shim having at least one load bearing region on opposite sides of said opening and adapted to be positioned at least in part under the head of said fastener, said load bearing region comprising superimposed multiple thicknesses of said sheet material.

2. The article of claim 1, said multiple thickness being formed by a folded over tab of said sheet material.

3. An article of manufacture comprising a shim for establishing a desired spacing between two vehicle components clamped toward one another by at least one shanked fastener, the shim being in the form of a unitary body of sheet material having a thickness equal to a fraction of said spacing; at least one opening extending through said body for receiving said fastener shank, a substantial portion of surface area of the shim being a single thickness of the sheet material, said shim having at least one load bearing region defined by a region of multiple thickness of said sheet material, said multiple thickness being formed by a folded over tab of said sheet material, said tab comprising material removed to form said opening.

4. The article of claim 1, said sheet material comprising sheet metal.

5. An article of manufacture comprising a shim for establishing a desired spacing between two vehicle components clamped toward one another by at least one shanked fastener, the shim being in the form of a unitary body of sheet material having a thickness equal to a fraction of said spacing; at least one opening extending through said body for receiving said fastener shank, a substantial portion of the surface area of the shim being a single thickness of the sheet material, said shim having at least one load bearing region defined by a region of multiple thickness of said sheet material, said shim including a pair of loading bearing regions flanking said opening and formed of material removed to define said opening.

6. An article of manufacture comprising a vehicle bumper shim in the form of an integral body of sheet metal including three generally parallel tines and a base interconnecting first ends of said tines, a pair of elongated bolt-receiving slots defined between said tines and having open ends between second ends of said tines, said shim having a plurality of load bearing regions including two such regions at spaced positions along each slot, the majority of the surface area of said shim being a single thickness of said sheet metal, and said load bearing regions being a multiple thickness of said sheet metal.

7. The article of claim 6, said multiple thickness comprising a double thickness.

8. The article of claim 6, said load bearing regions comprising folded over tabs of said sheet metal body.

9. The article of claim 8, further comprising a plurality of openings in said body disposed along said tines in regions other than said load bearing regions.

10. The article of claim 8, further comprising ridges embossed in said tines extending between load bearing regions and having heights substantially equal to the thickness of said sheet metal.

11. The article of claim 8, said body including additional multiple thickness folded over regions along said tines.

12. A shim for use in mounting a vehicle bumper assembly component to a support member with at least one shanked fastener having a head said shim comprising:
a generally planar, sheet metal, fork-shaped body including a base portion and a plurality of tine portions extending from said base portion;
at least one slot defined between adjacent tine portions through which the fastener shank is adapted to extend in a direction transverse to the plane of the body; and
ear portions of said two adjacent tine portions integral with said body and folded back into flat engagement with said body to define load bearing regions of double thickness along said tines, said load bearing regions being at least in part under the head of said fastener.

13. A mounting assembly for a vehicle bumper including a support member and a bumper member; a regular array of mounting bolts extending from one said member; a regular array of openings in the other said member through which said bolts extend; a nut on each bolt for clamping the support and bumper members together, and a shim sandwiched between the support and bumper members to establish a predetermined spacing therebetween; said shim comprising:
a unitary sheet of metal having a thickness equal to one-half of the predetermined spacing;
said sheet being in the shape of a fork with at least three generally parallel tines separated by slots;
at least two bolts extending through each slot adjacent load bearing portions of the tines; and
said load bearing portions including folded over double thickness portions of said sheet of metal.

14. A method of manufacturing a vehicle bumper shim comprising the steps of periodically advancing a web of sheet metal to a sequence of work stations wherein the following operations are performed:
providing a pair of spaced, elongated generally parallel openings in the web to define a central band and two edge bands in the web;
slitting the web at the ends of said openings to define aligned pairs of ears extending from said bands; and
folding said ears over onto said web to provide regions of increased thickness along said bands;
and severing the web to separate from the end of the web a forked-shaped shim having a base from which the strips extend to form tines.

15. The method of claim 14 wherein said folding step includes:
folding the ears from the plane of the web into planes normal to the web; and folding the ears from said normal planes against unfolded portions of the web.

16. A manufacturing method for a vehicle bumper shim having tines separated by a slot through which bolts are adapted to extend, said method comprising the steps of:

cutting material from a sheet metal blank to define a partial slot;

slitting the blank adjacent said partial slot to define an ear integral with the blank extending into the slot; and folding said ear over onto the adjacent tine simultaneously to define the completed slot and to form a multiple thickness region with material formerly within the slot.

17. The method of claim 16 wherein said slitting step defines adjacent ears on two tines on opposite sides of the slot, and wherein said folding step includes folding said adjacent ears away from one another onto said two tines.

* * * * *